Oct. 9, 1934.  A. D. ROLLINS  1,976,248
DISPATCHER
Filed Oct. 11, 1926  9 Sheets-Sheet 1

Inventor
Arch D. Rollins
by Parker & Carter
Attorneys

Oct. 9, 1934.   A. D. ROLLINS   1,976,248
DISPATCHER
Filed Oct. 11, 1926   9 Sheets-Sheet 2

Oct. 9, 1934.　　　A. D. ROLLINS　　　1,976,248
DISPATCHER
Filed Oct. 11, 1926　　　9 Sheets-Sheet 3

Inventor.
Arch D. Rollins
by Parker & Carter
Attorneys.

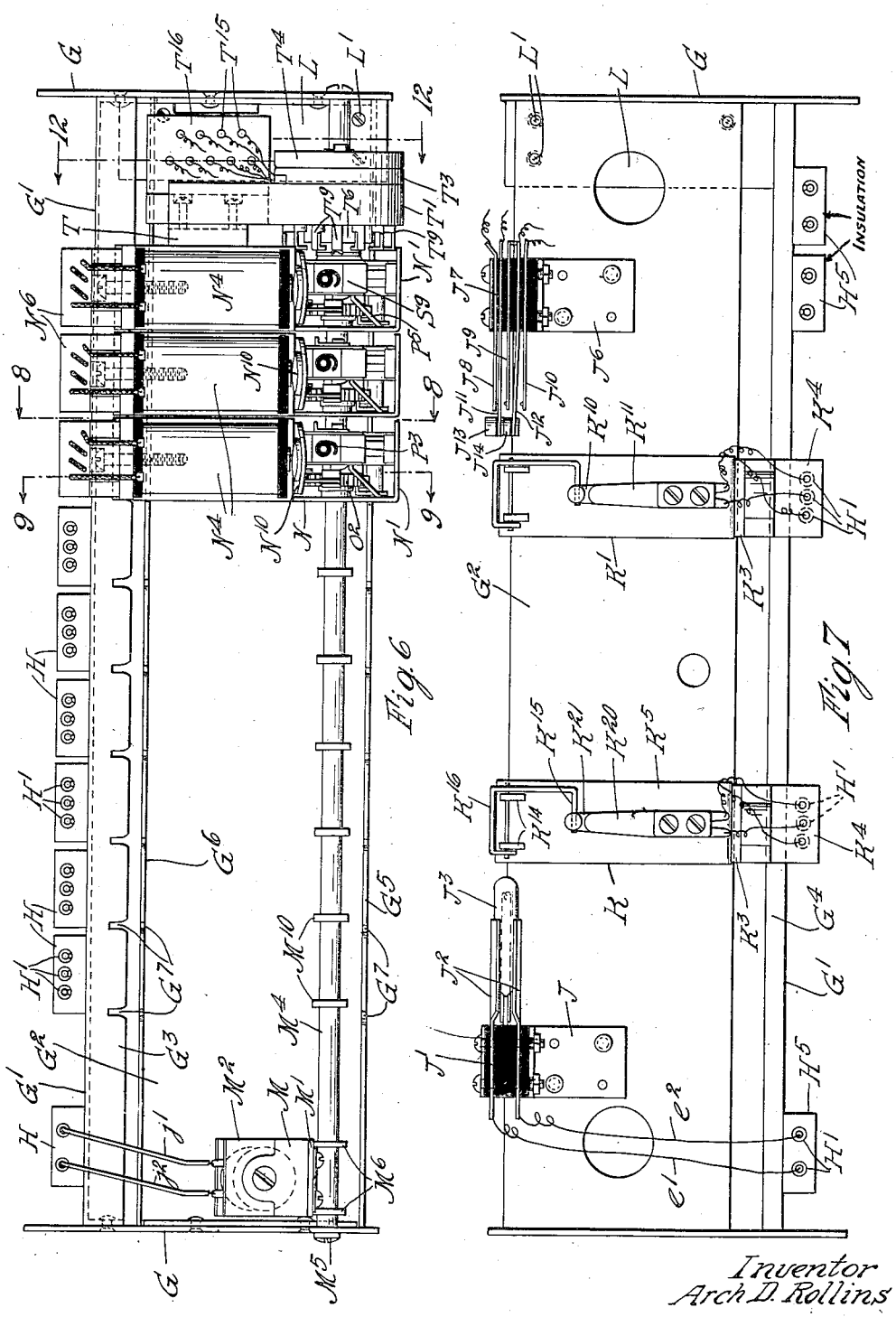

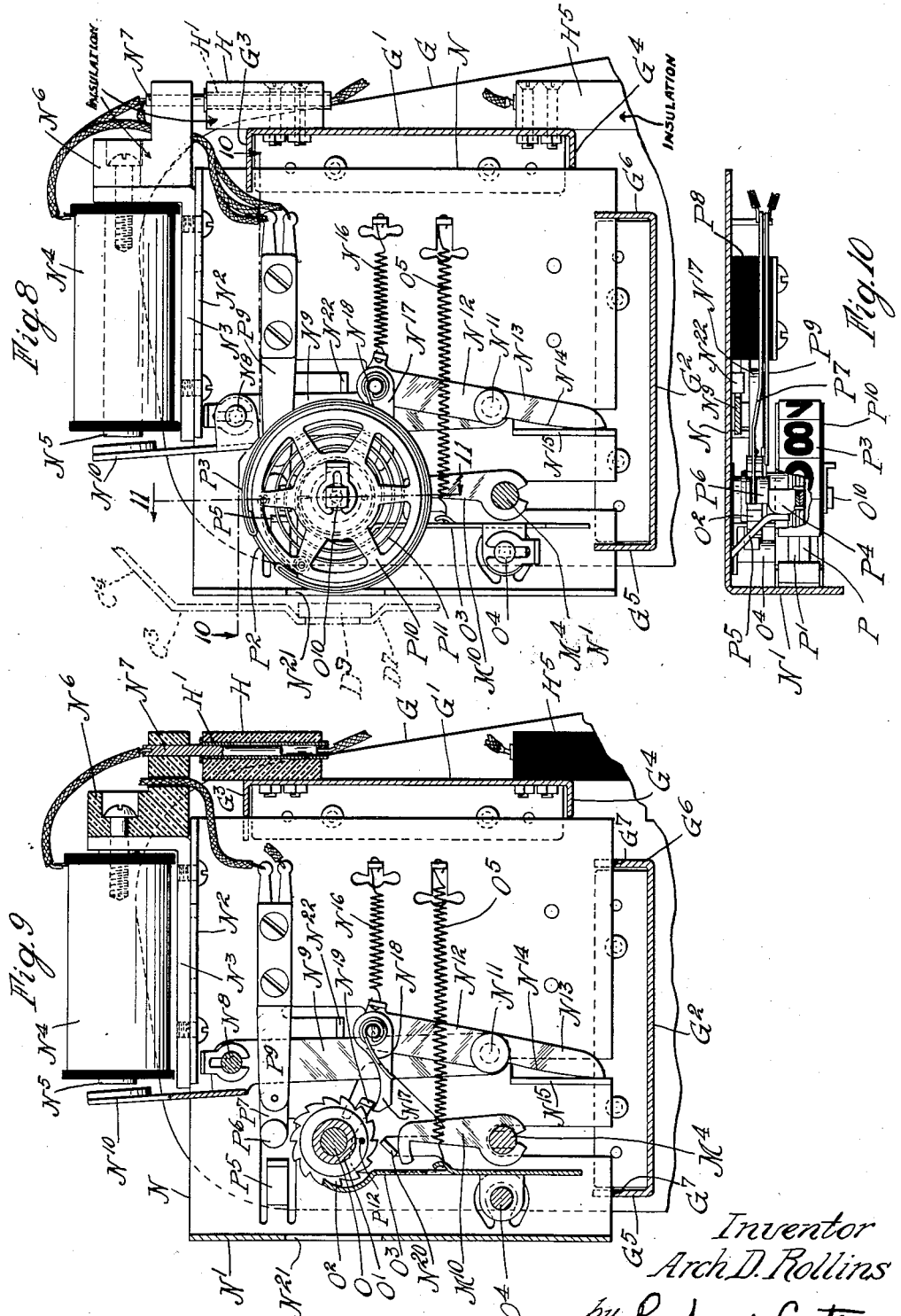

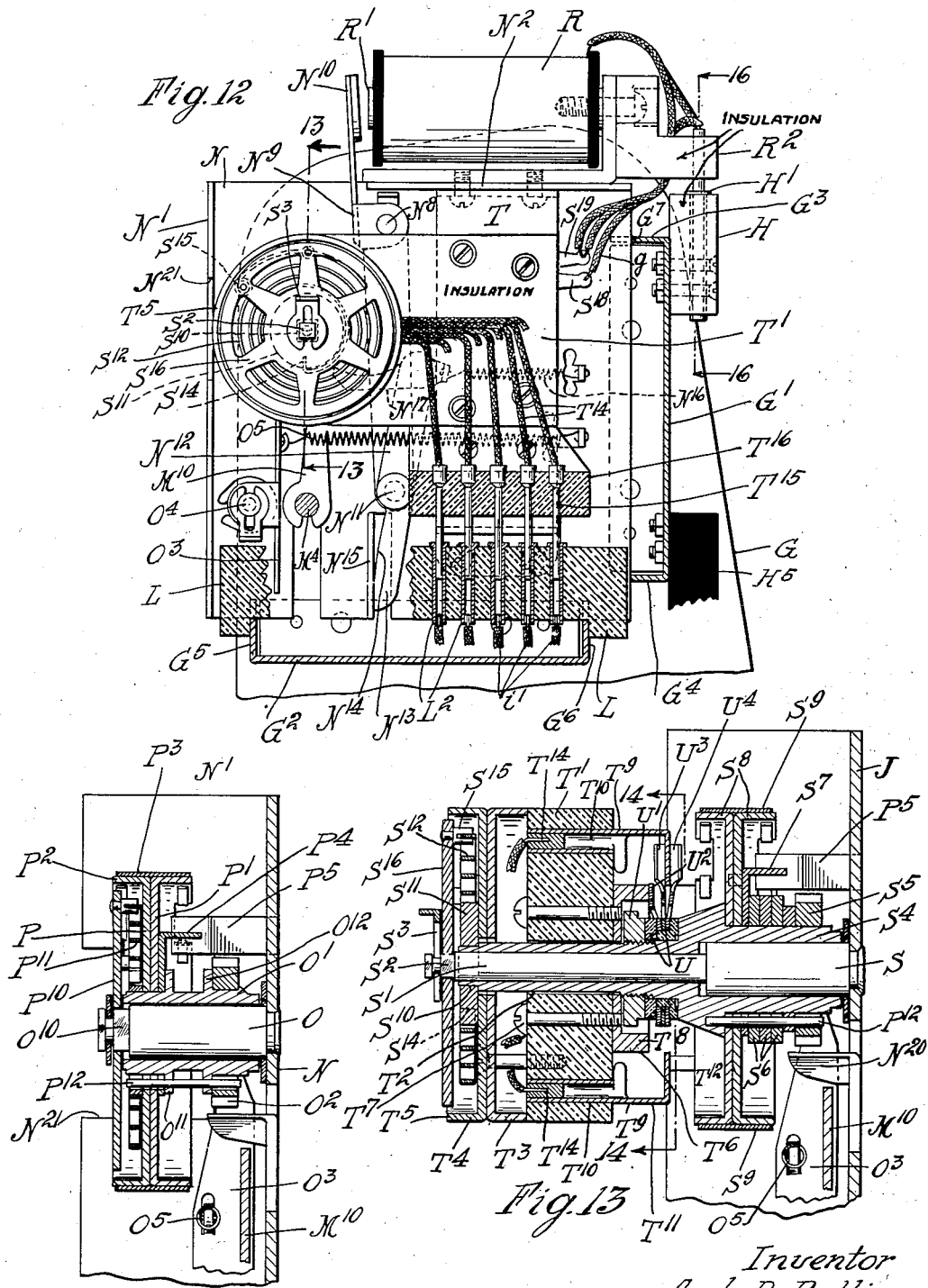

Patented Oct. 9, 1934

1,976,248

UNITED STATES PATENT OFFICE 1,976,248

DISPATCHER

Arch D. Rollins, Chicago, Ill., assignor to Lothar Ederer, Chicago, Ill.

Application October 11, 1926, Serial No. 140,721

21 Claims. (Cl. 177—338)

My invention relates to dispatcher and controlling means for timing and controlling factory operations. One object of my invention is to provide improved factory control means whereby a central station may at all times be informed of conditions in the work in various parts of the factory. Another object is to provide such means whereby by a simple system of signals, a central station may be kept informed as to the specific progress of specific pieces or jobs of work going on through the various parts of the factory. Another object is the provision of a central station, and a plurality of sub-stations in quick and easy communication with the central station, whereby the central station may by signal receive from and impart to the substations necessary information. Other objects will appear from time to time in the course of the specification and claims.

I illustrate my invention more or less diagrammatically in the accompanying drawings, wherein—

Figure 6 is a plan view with parts removed of the interior mechanism of the unit with the housing removed;

Figure 7 is a bottom view of the same mechanism;

Figure 8 is a section on the line 8—8 of Figure 6;

Figure 9 is a section on the line 9—9 of Figure 6;

Figure 10 is a section on the line 10—10 of Figure 8;

Figure 11 is a section on the line 11—11 of Figure 8;

Figure 12 is a section on the line 12—12 of Figure 6;

Figure 13 is a section on the line 13—13 of Figure 12;

Like parts are indicated by like characters throughout the specification and drawings.

It will be understood that I employ a number of sending and receiving units, of which one may be a central station and the others branch stations. The mechanisms of the various units are similar, the differences between them being largely in matters of wiring and circuit.

Referring for example to Figures 1, 2, 3 and 4, A generally indicates a base member, herein shown as of sheet metal, consisting of the bottom plate $A^1$, the upstanding circumferential side wall $A^2$, the ledge $A^3$ inwardly projecting therefrom and the flange $A^4$ upwardly projecting from the ledge $A^3$. The flange $A^4$ is at each end inwardly and then upwardly continued, to form the upstanding wings $A^5$.

At each end of the base A is positioned a block B, held in position for example by the screws $B^1$. In it is rotatably mounted the pin $B^2$, provided with a key aperture $B^3$ at its outer end and with a hook element $B^4$ at its inner end. $B^5$ is any suitable member for preventing axial movement of the pin $B^2$, the pin being grooved as at $B^6$. The wall $A^4$ is cut away as at $B^7$ to permit the rotation of the hook $B^4$.

Resting upon the ledge $A^3$ and centered by the flange $A^4$ is any suitable housing member, generally indicated as C, including a generally vertical rear wall $C^1$, a short vertical front wall $C^2$, a rearwardly inclined forward face $C^3$, a horizontal top $C^4$ and end walls $C^5$. Positioned in the forward front face $C^3$ is any suitable indexing mechanism, including the fixed stop D and the rotating member $D^1$ provided with the various apertures $D^2$ overlying the fixed indicating symbols $D^3$. $D^4$ is a push button positioned in the same inclined forward face $C^3$ of the housing and $D^5$ is the glass or lens preferably red.

The housing face is forwardly upset as at $D^7$ and apertured as at $D^8$, the upset portion being adapted to receive a pane of glass $D^9$ to close such aperture. $D^{10}$ are headed pins on the inside of the ends of the housing, such pins being adapted to be engaged by the hooks or latches B⁴.

Mounted on the bottom of the base member A is the block E of insulating material upon which are a plurality of contact strips E¹ held for example by the screws E², the block as a whole being held in position by the screws E³. Mounted on the inside of the rear wall of the housing are a plurality of holding clips E⁵ adapted to receive the contact holding plugs E⁶ of insulating material. Mounted in such plugs are the spring pressed plungers or pins E⁷, adapted to engage the contact strips E¹ when the housing is in position on the base. E⁸ are any suitable conductors, communicating with the plungers E¹, which extend to the dial mechanism above described.

Figure 19:
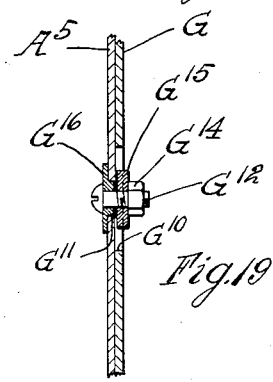
Figure 19 is a section on the line 19—19 of Figure 2.

Mounted between the upwardly projecting wings A⁵ is a supporting or cradle mechanism comprising end plates G, connected by the transverse members G¹ G² riveted or otherwise secured thereto. The member G¹ is flanged at front and rear as at G³ G⁴, the lower flange G⁴ being substantially shorter than the upper flange. The member G² is flanged at each edge as at G⁵ G⁶. The flanges G³ G⁵ G⁶ are notched at intervals as at G⁷, the width of the flanges at the bottom of the notches being substantially equal to the flange G⁴. The end members G are slotted at three points as at G¹⁰, these slots overlying the transverse slots G¹¹ in the wings A⁵, the intersecting slots permitting adjustment of the relation of the opposed plates. G¹² are any suitable securing bolts with the nuts G¹⁴, the inner washer G¹⁵ and the outer washer G¹⁶, as shown in Figure 19.

Figure 16:
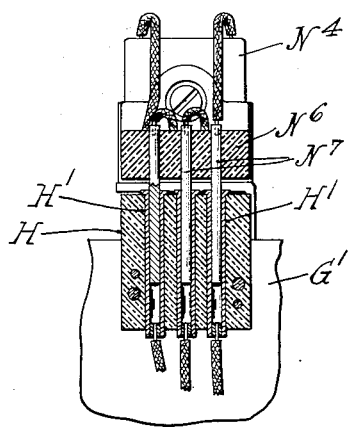
Figure 16 is a section on the line 16—16 of Figure 12.
Figures 17, 18:
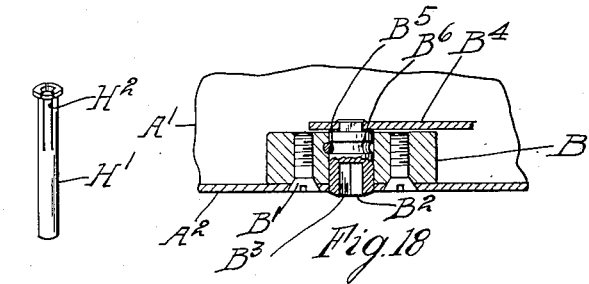
Figure 17 is a detail view of a contact sleeve.
Figure 18 is a section on the line 18—18 of Figure 2.

Secured to the upper edge of the lower side of the member G¹ are a plurality of blocks H of insulating material apertured to receive a plurality of contact sleeves H¹ which are upwardly slotted as at H², as shown in Figure 17. Each such sleeve has secured at its lower end, as shown in Figure 16, any suitable wire or conductor.

Secured to the lower edge of the rear of the member G¹ are a plurality of blocks H⁵ similar to the blocks H and provided with similar slotted contact sleeves H¹.

Riveted or otherwise secured to the member G² adjacent the upper portion of the bottom thereof is the bracket member, J, to which is secured the insulating block, J¹, to which are secured the clip and conductor members, J², associated with which is a light, J³, herein shown as a standard telephone light. The light, J³, is centered beneath the glass or lens D⁵, earlier mentioned and secured adjacent the opposite end of the member G² is the similar bracket member, J⁶, with the insulating block, J⁷, in which is mounted a double switch comprising three stationary leaves or contacts, J⁸, J⁹, J¹⁰, between which are located the two movable leaves, J¹¹, J¹², provided with the insulating spacing members, J¹³, J¹⁴. It will be understood that the switch is positioned beneath the switch button, D⁴, and that a pressure upon the bottom, D⁴, will move the switch leaves J¹¹, J¹².

Secured to the lower face of the member, G², intermediate the brackets, J and J⁶, are two identical quick acting magnets, K, K¹, each comprising a bracket member, K², having an outwardly turned flange, K³, to which is secured a contact block, K⁴, and the switch bracket, K⁵. K³, K⁴, K⁵ are herein shown as secured together by the screw, K⁶, the inner end of which serves also to support and position the magnetic coil, K⁷, by axial engagement with its core, K⁸.

Mounted on the switch bracket, K⁵, of the quick acting magnet K¹, in which are mounted the switch leaves, K¹⁰, K¹¹, K¹⁰ being provided with a terminal insulated block, K¹² are ears projecting outwardly from the switch bracket, K⁵. To them is pivoted the switch controlling lever, one arm of which, K¹⁵, is adapted to engage the block, K¹², on the leaf, K¹⁰, and the other arm of which, K¹⁶, is adapted to be drawn to the core, K⁸, of the electromagnet, K⁷, in response to its electric actuation. The leaf, K¹⁰, is in such case thrust into contact with the leaf, K¹¹, the switch being thus closed in response to and during actuation of the electromagnetic coil, K⁷. The magnet K has mounted on the insulating block K⁹ the switch leaves K²⁰, K²¹.

Secured to the opposite side of the member, G², adjacent one end thereof is the insulating block, L, held for example by the screws, L¹, and provided with nine contact sleeves, L², substantially identical with the contact sleeves, H¹, earlier described.

Figure 3:
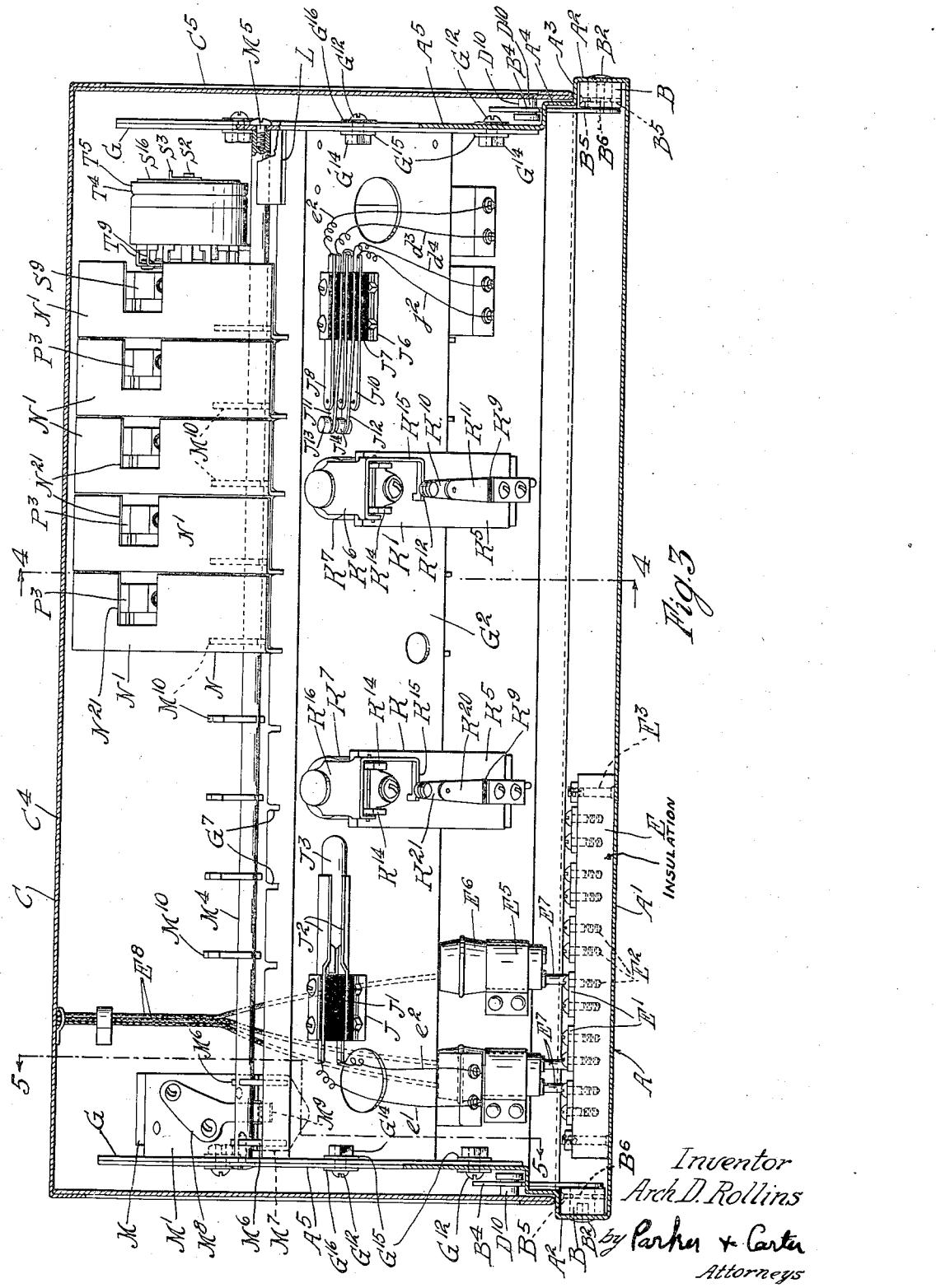
Figure 3 is a section on the line 3—3 of Figure 2.
Figure 4:
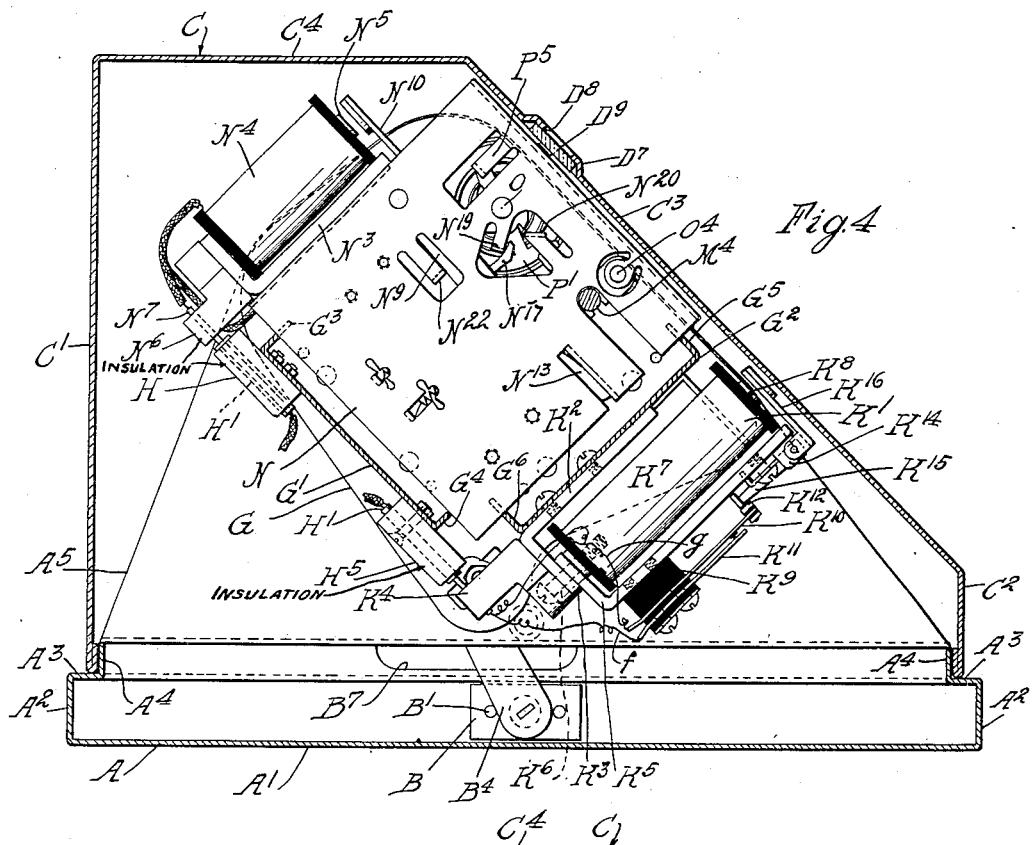
Figure 4 is a section on the line 4—4 of Figure 3.
Figure 5:
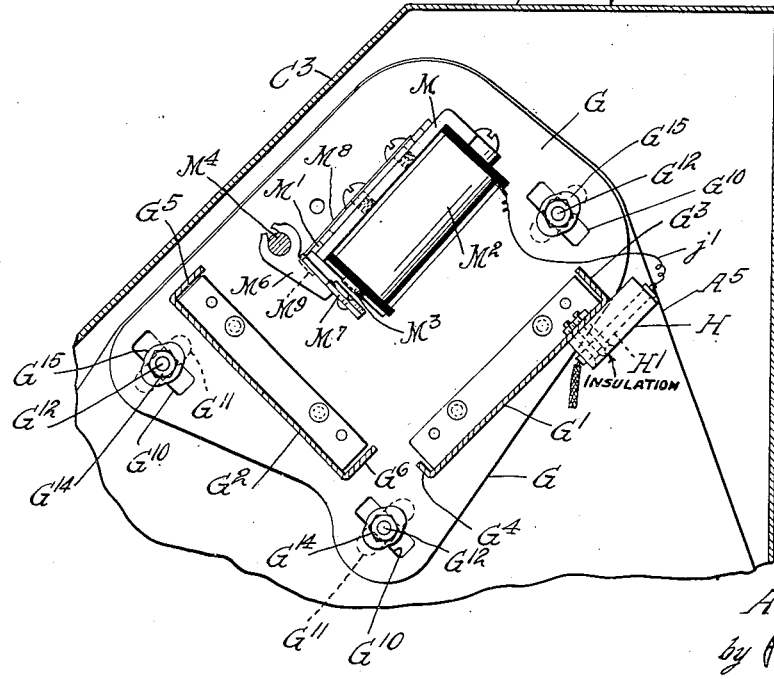
Figure 5 is a section on the line 5—5 of Figure 3.

Secured to one of the end plates G of the cradle, for example as shown in Figures 3, 5 and 6, is a bracket member, M, mounted upon the flange, M¹, inwardly projecting from the plate, G. The bracket carries the electromagnet, M², with the core, M³. M⁴ is a shaft rotatably mounted in the plates, G, and extending from end to end of the cradle, it being held at the ends for example by the screws, M⁵, passing through the plates, G. Mounted thereupon is the arm, M⁶ and the plate M⁷, opposed to the core, M³, of the electromagnet. It is to be understood that actuation of the electromagnet will draw the arm, M⁶, toward the core, M³, and thus rotate the shaft, M⁴. M⁸ indicates a stop member with the terminal, M⁹, adapted to limit the downward movement of the lever, M⁶, when it drops, in response to gravity, during inactivity of the magnet. It will be understood that the shaft, M⁴, carries a plurality of levers, M¹⁰, the purpose of which will later be indicated.

Mounted upon the members, G¹, G², and seating in the slots, G⁷, are a plurality of indicator units and a single advance unit. Indicator units are identical and but one will be described. Each such indicator unit, shown in detail for example in Figures 8, 9 and 10, consists of a side plate, N, with a forward flange, N¹, at right angles thereto and an upper flange, N², likewise at right angles to the plate. Mounted upon the flange N² is the bracket, N³, carrying the electromagnetic coil N⁴, with its core, N⁵. It also carries the insulating block, N⁶, carrying three contact pins, N⁷, adapted to engage the contact sleeves, H¹, in the block, H. This is shown particularly in Figures 6, 7 and 12.

Pivoted to the plate, N, as at N⁸, is the lever, N⁹, having a portion, N¹⁰, opposed to the core N⁵, of the electromagnet. At the lower end of the lower arm of the lever is pivoted as at N¹¹, a supplemental lever having an upper arm, N¹², and a lower arm, N¹³, having a rocking or cam surface, N¹⁴, opposed to a lug, N¹⁵, on the plate N. The upper arm of the lever N¹², is normally moved to the right, as shown in Figure 9, by the tension spring, N¹⁶. It carries a dog, N¹⁷, normally moved in clockwise direction by the spiral spring, N¹⁸, against the guide or stop, N¹⁹. N²⁰ is a stop to limit the movement of the dog. N²² is a stop on the plate N to limit the turning of the lever N⁹.

O is a shaft fixed upon the plate N upon which is mounted a sleeve, O¹, to which is fixed a ratchet wheel, O². Counter-clockwise direction of rotation of the sleeve and ratchet wheel is prevented by the pawl, O³, pivoted as at O⁴, to the plate and normally held in operating position by the tension spring, $O^5$. It will be understood that at each actuation of the electromagnet, $N^4$, the member, $N^{10}$, will be drawn to the core, $N^5$, over the lower arm of the lever, $N^9$, removed to the lever, as shown in Figure 9, the lever arm, $N^{13}$, will engage the stop, $N^{15}$, and rotate about the pivot, $N^{11}$. The dog, $N^{18}$, will be thrust along the guide, $N^{19}$, to engage the ratchet teeth of the wheel, $O^2$, imparting to the wheel and sleeve, $O^1$, a clockwise direction. The stop, $N^{20}$, limits this movement to a distance substantially equal to the length of one of the ratchet teeth, the pawl, $O^3$, being overreaching by one tooth and engaging the next tooth to prevent rotation of the sleeve in the opposite direction. It will be understood that the reset shaft, $M^4$, with its lever, $M^{10}$, will upon its counter-clockwise rotation as shown in Figure 9, move the pawl, $O^3$, into inoperative position, thereby releasing the ratchet wheel and permitting retrograde rotation of the sleeve, $O^1$.

The sleeve, $O^1$, as shown in Figure 9, the control of the rotation of which has above been described, carries the following indicator mechanism: $P$, $P^1$ are cupped wheels with the outwardly turned rims or flanges, $P^2$, upon which is positioned the indicator strip, $P^3$. $P^4$ is a stop element associated with the wheels, $P$, $P^1$, and adapted to engage the fixed stop, $P^5$, on the plate, $N$, at the limit of rotation of the wheels. The stop, $P^4$, also engages the insulated block, $P^6$, on the end of the switch leaf, $P^7$, mounted in the insulating block, $P^8$. Referring to Figure 10, when the stop, $P^4$, is engaging the fixed stop, $P^5$, and prior to rotation of the indicating assembly, it is in engagement with said block, $P^6$, and is holding the switch leaf, $P^7$, out of contact with the opposite switch leaf, $P^9$. As soon as the assembly is rotated and as soon as the stop, $P^4$, clears the block, $P^6$, the switch is closed and remains closed until the said stop returns to its initial position. The squared portion, $O^{10}$, of the shaft, $O$, carries the plate, $P^{10}$, thereby fixed against rotation. Between the plate, $P^{10}$, and the sleeve, $O^1$, is the spiral spring, $P^{11}$, adapted normally to rotate the sleeve, $O^1$, in counter-clockwise direction, as shown in Figures 9 and 11, this tendency being normally checked by the interposition of the pawl, $O^3$. $P^{12}$ is a pin which passes through the wheels, $P$, $P^1$, the stop, $P^4$, and the ratchet wheel, $O^2$, and through flanges, $O^{11}$, $O^{12}$, on the sleeve, $O^1$, thus holding the entire assembly against relative rotation.

It will be understood that the indicator member $P^3$, may be provided with any desired symbols, the indicator strip and the wheels upon which it is mounted being aligned with the glass, $D^7$, the forward flanges, $N^1$, of the plate, $N$, being cut away as at $N^{21}$ to render the signals visible.

Figure 14:
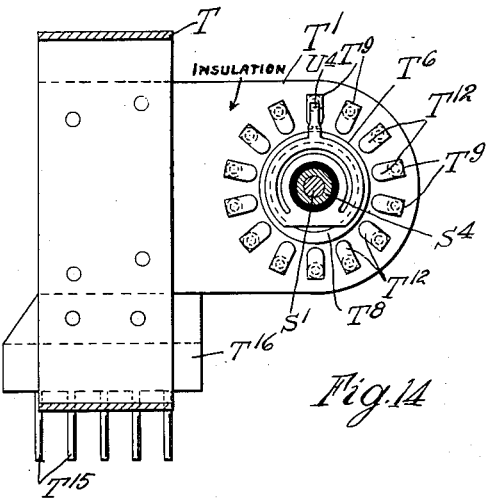
Figure 14 is a section on the line 14—14 of Figure 13.

Figures 12, 13 and 14 illustrate the advance unit adapted to control the advance or movement of the successive individual indicator units in response, for example, to dialing. The advance units include a frame structure substantially identical with that of the indicator units, including the side plate $N$ with the forward flange $N^1$ at right angles to it, and the upper flange $N^2$, also at right angles to the plate. The same bracket $N^3$ carries an identical electro-magnetic coil $R$, with its core $R^1$ and the insulating block $R^2$ with the three contact pins on each side, adapted to engage the contact sleeves $H^1$ in one of the blocks $H$.

Similarly, the lever $N^9$ is pivoted as at $N^8$ to the plate $N$ and supports a portion $N^{10}$, opposed to the core $N^5$ of the electro-magnet. The lower end of the lever has pivoted to it, as at $N^{11}$, the supplemental lever with the upper arm $N^{12}$ and the lower arm $N^{13}$, with its rocking or cam surface $N^{14}$ opposed to the lug $N^{15}$ on the plate. The upper arm $N^{12}$ is normally moved to the right, as shown in Figure 12 by the tension spring $N^{16}$ and carries the dog $N^{17}$.

$S$ is a shaft secured to the plate $N$ and $S^1$ is a reduced shaft portion forwardly extending from the end of the thicker portion of the shaft. The reduced portion is squared at the end as at $S^2$, and provided with a lock spring clip $S^3$.

Surrounding the shaft $S$, $S^1$ is the sleeve $S^4$, conforming thereto. Mounted about that portion of the sleeve which surrounds the thicker portion $S$ of the shaft is the ratchet wheel $S^5$, the spacers $S^6$, the stop member $S^7$ adapted to engage the fixed stop $P^5$, on the plate $N$, and the indicator discs $S^8$ with the indicator strip $S^9$, the structure being substantially the same as that shown in Figure 11 and employed for the individual indicator units.

The portion of the sleeve $S^4$ which surrounds the reduced portion $S^1$ of the shaft carries a number of elements below described and terminates in a squared portion $S^{10}$ upon which is mounted a disc $S^{11}$ surrounded by the spring $S^{12}$ the inner end of the spring penetrating a slot $S^{14}$ of the disc and the outer being secured to the member $S^{15}$ inwardly projecting from the wheel $S^{16}$ fixed on the square portion $S^2$ of the shaft $S$ and held in position by the upper spring lock member $S^3$. The stop member $S^7$ is adapted to engage the fixed stop $P^5$ on the plate $N$ and to actuate the switch levers $S^{18}$, $S^{19}$, identically as the stop member $P^4$ actuates switch levers $P^7$ and $P^9$.

The parts above described are substantially identical in form and operation to the corresponding parts shown in Figure 11 and found in the individual indicator units.

Mounted on the lower portion of the shelf $N^2$ is the sheet metal bracket $T$ to which is secured the block $T^1$ of insulating material centrally apertured as at $T^2$ to permit the passage of the reduced portion of the sleeve $S^4$. Secured to the outer face of the block $T^1$ are the shield members $T^3$ $T^4$ positioned back to back, as shown in Figure 13, the outer rim $T^5$ of the member $T^4$ extending outwardly around and surrounding the spring $S^{12}$.

Mounted on the block $S^4$ concentrically about the central aperture $S^2$ is the contact ring $T^6$ secured for example by the screws $T^7$ and having the outwardly projecting rim or flange $T^8$. Mounted concentrically about it are a plurality of contacts $T^9$ each including the hollow sleeve $T^{10}$ passing through the block $T^1$, the outwardly projecting portion $T^{11}$ and the inwardly turned portion $T^{12}$. $T^{14}$ is any suitable wiring connection extending from such contacts to the contact pins $T^{15}$ in the block $T^{16}$ secured to the bracket $T$. It will be understood that there is a pin and a wiring connection for each of the indicator units.

Mounted about the reduced portion of the sleeve $S^4$ are any suitable insulating rings $U$ held in position by the locking member $U^1$ and having mounted thereupon three wipers $U^2$, $U^4$. The wiper $U^2$ is adapted to wipe the outer face of the flange $T^8$. $U^3$ and $U^4$ wipe the opposite sides of the inwardly turned portions $T^{12}$ of the contact member $T^9$.

Figure 20:
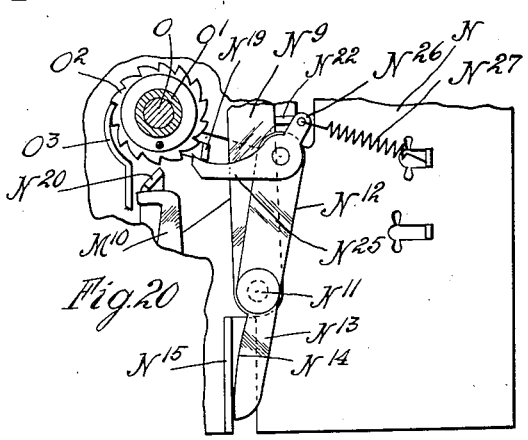
Figure 20 is a detail view of a modification.

Referring to Figure 20, which is a modified form of the operation of the structure shown for example in Figures 8 and 9, the upper arm $N^{12}$ of the supplemental lever pivoted to the lower end of the lever $N^9$ has pivoted to it a dog $N^{25}$ having an upwardly extending ear $N^{26}$ to which is secured the single tension spring $N^{27}$ which carries out the function both of the springs $N^{16}$ and $N^{18}$, as shown in Figure 9, drawing the rear arm to the right and imparting a clockwise movement to the dog $N^{25}$.

Figure 15:
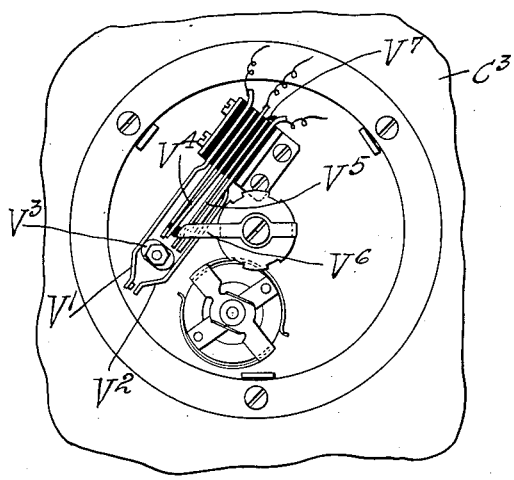
Figure 15 is a rear view of an indexing device.

As illustrated in Figure 15, the indexing device has at the rear a plurality of spring contacts insulated from each other, of which two $V^1$, $V^2$, are operated by the cam $V^3$ which in turn is actuated by the turning of the rotating member $D^1$. The cam $V^3$ is positioned so as to hold the spring contacts $V^1$, $V^2$ apart when the indexing device is at rest. The spring contacts $V^4$, $V^5$ are closed and opened by the lever $V^6$ in the usual manner. The spring contacts $V^2$ and $V^5$ are electrically connected as at $V^7$.

W indicates a switch-board panel of insulating material. Mounted thereon are a plurality of multiple jacks $W^1$ and pilot lights $W^2$, each pair representing a different substation which may be identified by numbers, as shown. Secured to each jack $W^1$ are a plurality of wires later to be described and generally indicated as $W^3$, which extend to the substations X.

Y is the control station having a phone plug $Y^1$ connected to the wire cord $Y^2$.

The use and operation of my invention are as follows:

One of the objects of my invention being to provide improved factory control means, whereby a central station may at all times follow up the work in various parts of the factory and whereby means of communication between a central station and sub-stations are provided, I have developed a system whereby from a plurality of sending stations information may be sent to a central receiving station, it being understood that the receiving station can send and the sending stations can receive. I thus provide a complete system of factory communication. The general operation of the device will be clear from Figure 22, a schematic layout or wiring diagram in which only two stations are shown, one of which may be considered the main receiving or central station and the other one of the supplemental stations.

Figure 1:
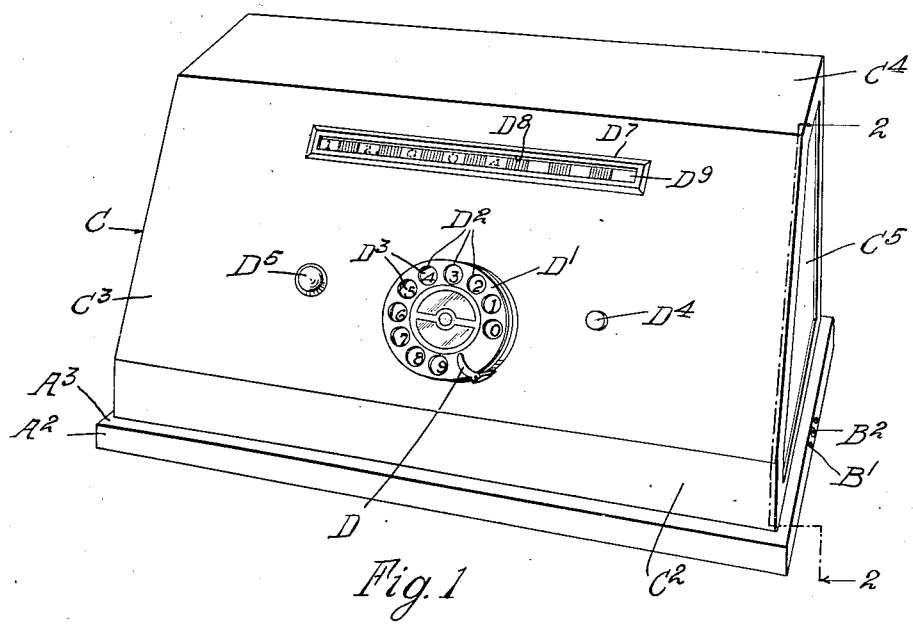
Figure 1 is a perspective view of one of the sending or receiving units.
Figure 2:
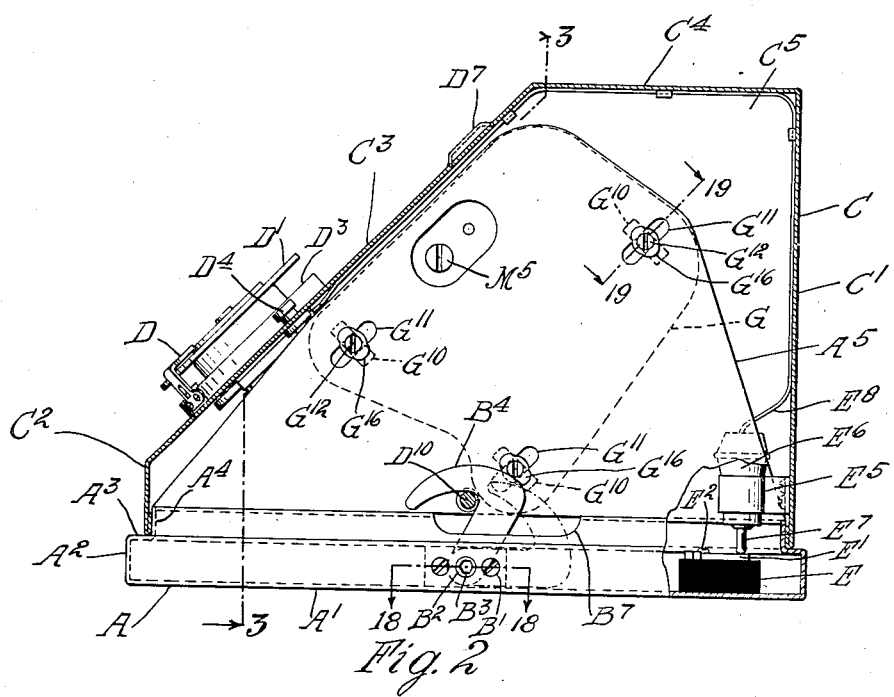
Figure 2 is a section on the line 2—2 of Figure 1.
Figure 21:
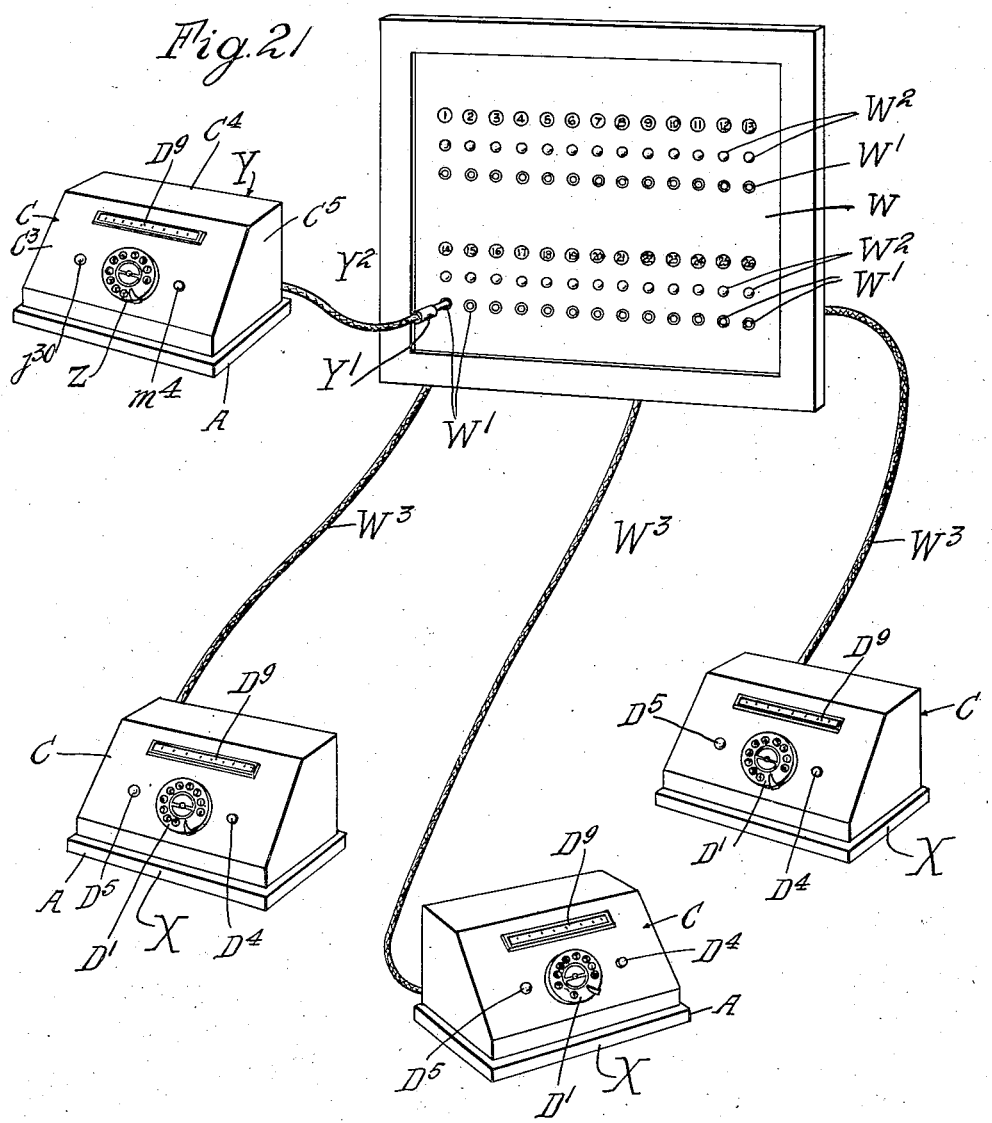
Figure 21 illustrates a schematic layout of a central station and substations of which three are shown.

In practice, each station includes a receiving and sending mechanism, housed as shown for example in Figures 1 and 2, and 21, with a dialing mechanism on the forward face of the housing C and a transparent window adapted to permit the observation of one symbol at a time upon each of the plurality of indicating cylinders or strips employed.

When an operator wishes to send a message from any of the substations, he presses the button $D^4$ which actuates the switch leaves $J^{11}$, $J^{12}$. The effect is to close the circuit through the pilot light $W^2$ on the switch-board W, along the conductive line $d$ from the battery $d^1$ along the conductor $d^2$, the light $W^2$ and line $d^3$, through the leaves $J^9$, $J^{11}$ back along the conductor $d^4$ and back through $d^5$ to the battery $d^1$. The light $W^2$ is preferably positioned only at the central station switch-board, and serves to indicate that an operator at a substation is trying to communicate. The central operator then takes the plug $Y^1$, which may be a regular telephone plug connected to the central station, and plugs it into the multiple jack $W^1$, thereby closing the circuit through the line $d$ from the battery $d^1$, the jack $W^1$, line $e$, wire $e^1$ through the light $J^3$ showing through the red lens $D^5$ on the face of the substation X, the wire $e^2$, spring leaves $J^8$, $J^{11}$ back through the wire $d^3$, the jack $W^1$, wires $e^3$, $d^5$ to the battery $d^1$. At the same time the circuit is closed through the pilot light $W^2$, independently of the closure of the manually operated switch button $D^4$, the circuit being made from the battery $d^1$ through the wires $d$, $d^2$, pilot light $W^2$, wire $d^3$, the jack $W^1$, lines $e^3$, $d^5$ back to the battery. At the same time the substation and the main station are so connected that any actuation of the dial of the substation will actuate the identical indicating members and actuate the advance units of the two stations identically so that identical signals will appear at both stations, thus enabling the sender to check his message.

Accordingly when the light $J^3$ is actuated, the sender, knowing that the connection has been made, proceeds to dial his message by actuating the rotating member $D^1$ with its apertures $D^2$ overlying the fixed indicating symbols $D^3$. The operator places his finger in the aperture over the desired number or letter to be indicated and rotates the member $D^1$ until his finger engages the stop D. The operation of this mechanism being the same as that commonly employed in that of automatic telephones, I have made no detailed description of this feature.

By rotating the member $D^1$ in clockwise direction, the arm $V^6$ moves out of contact with the leaf spring $V^4$, thereby closing the contact leaves $V^4$, $V^5$ and making electrical connection through the relay coils $K^1$ of the station X and coil $k^1$ of the central station Y. A circuit is established from the battery $d^1$ through the line $d$, multiple jack $W^1$, line $e$, wire $f$, the relay magnet $K^1$, wire $f^1$, $f^2$, the spring leaf contacts $V^4$, $V^5$ of the substation indexing dial, lines $f^3$, $d^4$, $d^5$ back to the battery $d^1$. Electrical connection is also made from the battery $d^1$ through the wires $d$, $f^4$, the relay magnet $k^1$ of the central station Y, lines $f^5$, $f^6$, the switch-board jack $W^1$, lines $f^7$, $f^2$, contact leaves $V^4$, $V^5$, lines $f^3$, $d^4$, $d^5$ back to the battery $d^1$. Magnetizing of relay coil $K^1$ causes switch leaves $K^{10}$, $K^{11}$ to be closed, thereby establishing an electrical circuit from the battery $d^1$, wire $d$, switch board jack $W^1$, wires $e$, $f$, contact leaves $K^{11}$, $K^{10}$, the line $g$, magnet R, lines $g^1$, $d^5$ and back to the battery. Through this impulse the magnet R attracts the upper portion $N^{10}$ of the lever $N^9$, which actuates the arm $N^{12}$, which by its rocking motion of its cam surface $N^{14}$ of the lower portion $N^{13}$ against the lug $N^{15}$ moves the dog $N^{17}$ to the left, thereby engaging a tooth of the ratchet wheel $S^5$ and turning the sleeve $S^4$ in clockwise direction. As soon as the assembly is rotated and as soon as the stop $S^7$ clears the switch contacts $S^{18}$, $S^{19}$, the switch is closed and establishes an electrical circuit which will be later described.

By turning of the sleeve $S^4$, the wipers $U^3$, $U^4$ are moved into contact with a contact sleeve $T^9$, thereby establishing an electrical connection through the magnet $N^4$ of the indicator unit farthest to the left. Through magnetizing of the relay coil $k^1$ of the central station, the contact leaves $k^{10}$, $k^{11}$ are closed and thereby established a circuit from the battery $d^1$, wires $d$, $f^4$, contact leaves $k^{10}$, $k^{11}$, wire $g^3$, the magnet coil $r$ of the advance unit of the central station Y, wires $g^4$, $g^5$, $d^5$ and back to the battery. Through this electrical impulse, the magnet $r$ of the advance unit of the central station causes the switch leaves $s^{19}$, $s^{18}$ to be closed and moves wiper $u^4$ into contact with a contact sleeve $t^9$, connected by wire $i^3$ with the magnet $n^4$ of the indicator unit farthest to the left. By the closing of the switch leaves $s^{19}$, $s^{18}$ electrical connection is made from the battery $d^1$ through the wires $d$, $f^4$, $g^6$, the red light $j^{30}$ of the central station Y, wire $g^7$, contact leaves $s^{18}$, $s^{19}$, wires $g^8$, $g^4$, $g^5$, $d^5$ back to the battery.

As soon as the operator of the substation X allows the rotating member $D^1$ of the dial to return to its original position, the cam $V^3$ rotates and closes and opens contact leaves $V^1$, $V^2$ as many times as the number dialed. Electrical circuits are thereby made from the battery $d^1$, wire $d$, jack $W^1$, wire $e$, relay magnet K of the substation X, wires $h$, $h^1$, contact leaves $V^1$, $V^2$ of the dial, wires $f^3$, $d^4$, $d^5$ back to the battery, and another from the battery $d^1$ through the wires $d$, $f^4$, $h^2$, relay contacts $k^{20}$, $k^{21}$, wire $i^2$, wiper $u^4$ of the advance unit of the central station Y, wire $i^3$, magnet $n^4$, wires $g^4$, $g^5$, $d^5$ and back to the battery.

As soon as the dial at X station is moved by the operator into the off-normal or operative position, negative battery is fed through $d^5$ through the dial contact $V^5$ into dial leaf spring $V^4$, thence through $f^2$, $f^1$, energizing $K^1$. The current divides between $f^1$ and $f^2$ and also travels through $f^7$ through jack $W^1$, thence through $f^6$, likewise energizing relay $k^1$ through $f^5$, thence through $f^4$ to $d$ to battery. Likewise the energy returns from $K^1$ through $f$, through $e$, through jack $W^1$ to wire $d$, to positive battery. It is seen, therefore, that $K^1$, $k^1$ are energized simultaneously and are in parallel. Likewise dial Z is wired in parallel with the dial at station X, through $f^7$ and $f^6$. Also $g^5$ supplies negative battery to dial Z. Likewise $d^5$ supplies direct negative battery to dial at station X.

When the cam $V^3$ on either dial X or Z is rotated a number of times predetermined by the digit dial, the contact springs $V^1$ and $V^2$ close. $V^2$ receives negative battery through $d^5$, $f^3$ and supplies negative battery to $V^1$, thence through $h^1$, wherein the current divides into $h$ and $h^6$. The current passing through $h$ energizes relay magnet coil K, returning to battery through $e$, through $d$, to positive battery; likewise $h^6$ through jack $W^1$ through $h^4$ in the plug $Y^1$ through $h^3$, thence to $k$ relay magnet, thence through $f^4$ to positive battery $d$.

Thus relay magnets K, $k$ receive impulses from either dial X or Z which cause these relays in turn to supply impulses from positive battery through $d$, through jack $W^1$, through $e$, through contact $K^{21}$ to $k^{21}$, thence through contacts on armature of relay $K^{20}$ and $k^{20}$, through $i^2$ and $i$, thence through wiper arm $U^4$, $u^4$ on each advance unit through the wire $i^3$, $i^1$ on each station X and Y, through the indicator unit magnet $N^4$, $n^4$ to negative battery through $g^1$ and $g^4$ and $d^5$.

The so-called reset magnets $M^2$, $m^2$ are operated in parallel any time that the buttons $m^4$ and $D^4$ are depressed. The leaf springs $m^5$ and $J^9$, $J^{11}$ receive energy as described above. This parallel operation of electro-magnets $M^2$ and $m^2$ only occurs when the plug with the cord attached is inserted in jack $W^1$ since the wire and contact $j^6$, $j^7$ through $j^9$ provides the paralleling of the electromagnets $M^2$, $m^2$ as herein set forth. Likewise the wire $j^5$ leading to plug contact $j^6$.

Magnetizing of the magnet coils $N^4$, $n^4$ causes the switch leaves $P^7$, $P^9$ of the substation X and the contact leaves $p^7$, $p^9$ of the central station Y to be closed, thereby establishing two circuits, one through the pilot light $W^2$ which will be later described, and another through the light $j^{30}$ of the central station.

Figure 22:
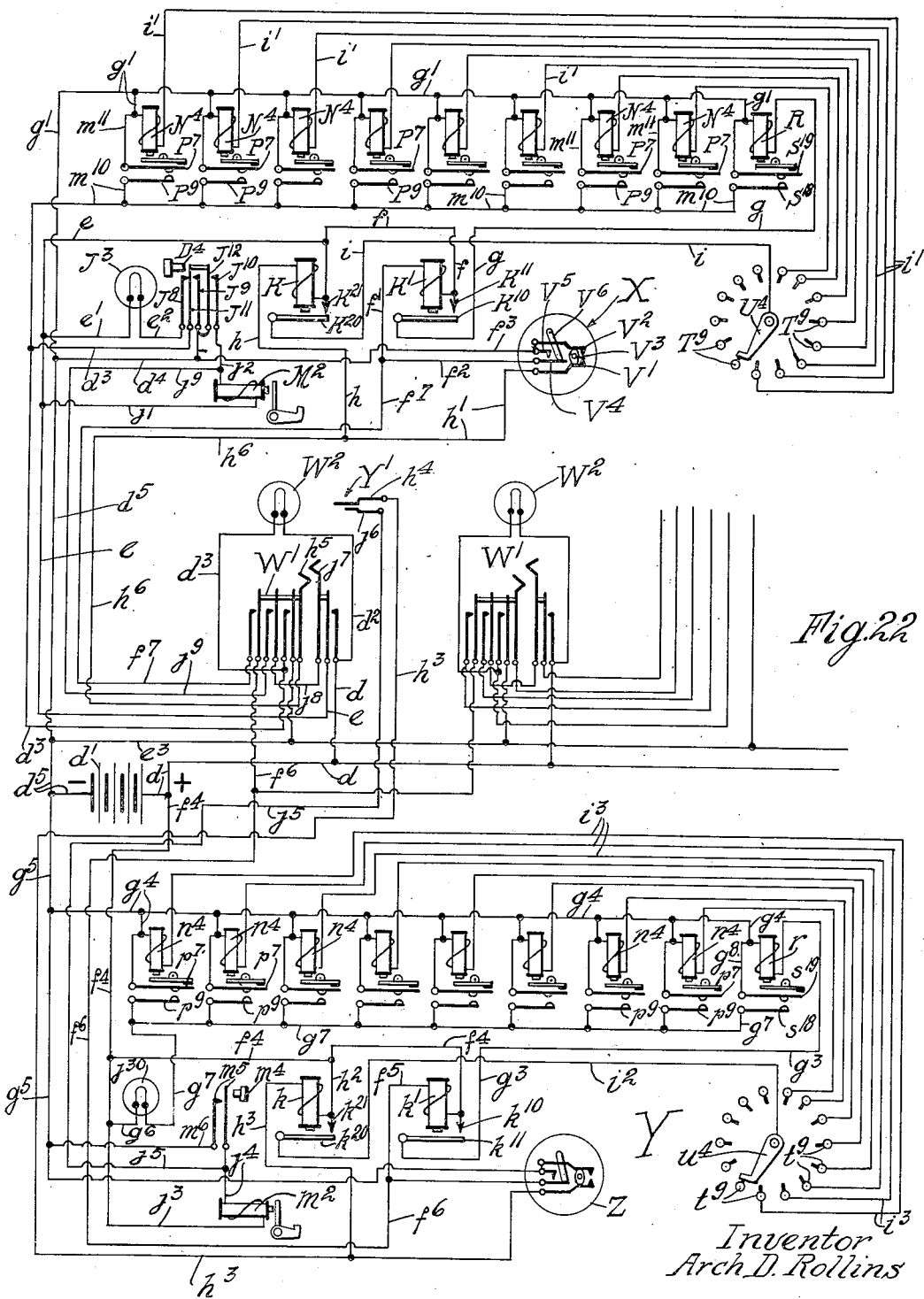
Fig. 22 is a diagram of connection showing complete circuit diagram from the central station and a sub-station.

Each successive dialing will advance wipers $U^4$, $u^4$ to the next following contact sleeves $T^9$, $t^9$ each of which is connected by a wire $i^1$ or $i^3$ with a magnet $N^4$ or $n^4$ of an indicator unit, as shown in Fig. 22.

Should the operator of the substation X desire to correct a message, by pressing of the push button $D^4$, electrical circuits are made through the reset magnets $M^2$, $m^2$ of both stations, one circuit from the battery $d^1$ through the wire $d$, jack $W^1$, wires $e$, $j^1$, reset magnet $M^2$ of the substation X, wire $j^2$, switch leaves $J^{10}$, $J^{12}$, wires $d^4$, $d^5$ and back to the battery. Another circuit from the battery $d^1$ through the wires $d$, $f^4$, $j^3$, reset magnet $m^2$ of the central station Y, wires $j^4$, $j^5$, contact $j^6$ of the telephone plug $Y^1$, spring contact $j^7$ of the jack $W^1$, wire $j^8$, through the jack $W^1$, wires $j^9$, $j^2$, spring contact $J^{10}$, $J^{12}$, wires $d^4$, $d^5$ back to the battery.

After receiving the message, the operator of the central station presses the push button $m^4$ of the receiving and sending device, thereby closing a switch, generally indicated as $m^5$. This switch is similar in construction to the one employed at the substation, but has only two spring leaves. By closing of the switch $m^5$, electrical circuits are made, one from the battery $d^1$ through the wires $d$, $f^4$, $g^6$, $j^3$, reset magnet $m^2$, wire $j^4$, reset switch $m^5$, wires $m^6$, $g^5$, $d^5$ and back to the battery. Another circuit from the battery $d^1$ through the wire $d$, jack $W^1$, wires $e$, $j^1$, reset magnet $M^2$, wire $j^9$, jack $W^1$, wire $j^8$, spring contact $j^7$ of the jack, contact $j^6$ of the plug $Y^1$, line $j^5$, reset switch $m^5$, wires $m^6$, $g^5$, $d^5$ back to the battery.

After resetting of the station, operator of the central station pulls out the plug $Y^1$. Should any of the indicator units or advance unit of a substation fail to function properly and any of the spring contacts $P^7$, $P^8$ or $S^{18}$, $S^{19}$ keep in contact with each other, the pilot light will stay alight, being in circuit with the battery $d^1$ through the wires $d$, $d^2$, pilot light $W^2$, wires $d^3$, $m^{10}$, spring leaves $P^9$, $P^7$ or $S^{18}$, $S^{19}$, wires $m^{11}$, $g^1$, $d^5$ and back to the battery.

The equipment is laid out in such a manner that any one of the various outlying stations X terminates upon an individual line jack $W^1$. By inserting the plug $Y^1$ in any of the jacks $W^1$ the central station receiving and recording equipment is connected to any one of the X stations as desired, so that a message may be transmitted from any outlying station to the central station. Likewise a message can be transmitted from the central station to any outlying station.

I claim:

1. In a two-way dispatcher system, a central station, a plurality of sub-stations, an impulse generator at each station, visual signal indicating devices associated with each station, signal actuating means associated with each station, and means for actuating selectively the indicating devices of one of said stations in response to actuation of the signal actuating means of one of said stations.

2. In a two-way dispatcher system, a central station, a plurality of sub-stations, an impulse generator at each station, visual signal indicating devices associated with each station, signal actuating means associated with each station, means for selectively placing the central station in connection with individual sub-stations and means for actuating selectively the indicating devices of said central station and the sub-station in which it is in connection, in response to the actuation of the signal device of one of them.

3. In a two-way dispatcher system, a plurality of stations, an impulse generator at each station, visual signal indicating devices associated with each station, signal actuating means associated with each station, and means for actuating selectively the indicating devices of one of said stations in response to actuation of the signaling device of one of said stations.

4. In a visual two-way dispatcher system, a central station, a plurality of sub-stations, an impulse generator at each station, conductive circuits and means for closing such circuits between the central and the individual sub-stations, signal devices associated with each station, and adapted to transmit a complete message in unison with the signal devices of the stations in which they are in circuit, and actuating means, on the individual stations adapted to actuate the signal devices of the station of the actuating means and of a station in circuit therewith.

5. In a two-way dispatcher system, a central station, a plurality of sub-stations, an impulse generator at each station, visual signaling means associated with each station, signal actuating means associated with each station, a switchboard associated with the central station, conductors extending from said sub-stations to said switchboard, and means associated with the main station for selectively closing a conductive circuit through said switchboard and said conductors, through the central station, and one sub-station.

6. In a two-way dispatcher system, a central station, a plurality of sub-stations, an impulse generator at each of such stations, visual signaling means associated with each station, signal actuating means associated with each station, a switchboard associated with the central station, single circuit conductors extending from said sub-stations to said switchboard, and means associated with the main station for selectively closing a conductive circuit through said switchboard and said conductors, through the central station, and one sub-station, signals on said switchboard adapted to indicate calls from the individual sub-stations, and actuating means therefor, associated with said sub-stations.

7. In a dispatcher system, a central station, a plurality of sub-stations, visual signaling devices associated with each station, said devices including a plurality of separately and successively actuable rotating signal drums, each such drum being provided with a plurality of signals, a signaling impulse transmitting member associated with each station, conductive circuits and means for closing such circuits between the central station and one sub-station and means for rotating said drums in response to actuation of said transmitting members, means for transmitting actuating impulses to the separate indicators in predetermined order, said individual signaling drums of the central station and of the sub-station in circuit therewith being adapted in response to actuation of the signal transmitting member of one of them, to be rotated in unison to indicate a signal corresponding to the signal transmitted.

8. In a dispatcher system, a central station, a plurality of sub-stations, visual signaling devices associated with each station, said devices including a plurality of separately and successively actuable rotating signal drums, each such drum being provided with a plurality of signals, a signaling transmitting member associated with each station, conductive circuits and means for closing such circuits between the central station and one sub-station and means for rotating said drums in response to actuation of said transmitting members, said individual signaling drums of the central station and of the sub-station in circuit therewith being adapted in response to actuation of the signal transmitting member of one of them, to be rotated in phase to indicate a signal corresponding to the signal transmitted, re-set means associated with the individual stations and adapted to re-set the signaling devices to their original position, and actuating means, associated with each station, adapted to actuate the re-set mechanism of such station and of the stations in circuit therewith, whereby a new series of signals may be transmitted.

9. In a station for a dispatcher system, a plurality of indicator drums, a plurality of symbols upon each said drum, means for stepping up each said drum by electrical impulses, a signaling means associated with said station and having associated with it a plurality of symbols corresponding to the symbols upon said drum, means for placing said signaling means in electrical actuating connection successively with the step-up mechanism of the individual signal drums, including an advance member having a plurality of contacts and a wiping member, a conductive connection between each said contact and the rotating means for one of said drums, and a conductive connection between the wiping member and the signaling means, and means for advancing said wiping member in response to each actuation of said signaling means, and means for actuating said rotating means and advancing each said drum, in succession, in response to actuation of the signaling means.

10. In a station for a dispatcher system, a plurality of indicator drums, a plurality of symbols upon each such drum, means for stepping-up each said drum by electrical impulses, adapted to advance it step by step, signaling means associated with said station and having associated with it a plurality of symbols corresponding to the symbols upon said drum, means for placing said signaling means in electrical actuating connection successively with the step-up mechanism of the individual signal drums, and means for actuating said rotating means and for advancing each said drum a predetermined number of steps, in response to actuation of the signaling means.

11. In a dispatcher system, a plurality of stations, and means for placing two of said stations in electric connection with each other, a plurality of indicator drums associated with each station, a plurality of symbols upon each said drum, means for stepping up each said drum by electrical impulses, a signaling means associated with each said station, means for placing said signaling means in electrical actuating connection successively with the step-up mechanism of the individual signal drums, of the station with which it is in connection, and means for actuating said rotating means and advancing said drums, in succession, in response to the actuation of such signaling means.

12. In a dispatcher system, a plurality of stations, and means for placing two of said stations in electric connection with each other, a plurality of indicator drums associated with each station, a magnet associated with each indicator drum, a lever controlled by said magnet and adapted to rotate said drum a predetermined distance in response to each movement of the lever, an electric circuit for each such magnet, signaling means associated with each said station and means responsive to actuation of said signaling means, for closing and breaking said magnet circuits, and means for placing said signaling means in actuating connection successively with the circuits for the magnets of the successive drums.

13. In a dispatcher system, a plurality of stations, and means for placing two of said stations in electric connection with each other, a plurality of indicator drums associated with each station, a magnet associated with each indicator drum, a lever controlled by said magnet and adapted to rotate said drum a predetermined distance in response to each movement of the lever, an electric circuit for each such magnet, signaling means associated with each said station and means responsive to actuation of said signaling means, for closing and breaking said magnet circuits, and means for placing said signaling means in actuating connection successively with the circuits for the magnets of the successive drums, including an advance member having a plurality of contacts and a wiping member, a conductive connection between each said contact and one of said magnets, a conductive connection between the wiping member and the signaling means, and means for advancing said wiping member in response to each actuation of said signaling means.

14. In a station for a dispatcher system, a plurality of indicator drums, a magnet for each such drum, a lever controlled by said magnet and adapted to rotate said drum a predetermined distance in response to each movement of the lever, an electric circuit for each said magnet, signaling means associated with said station and adapted to make and break the magnet circuits, and means for placing said signaling means in connection successively with the individual magnet circuits, including an advance member having a plurality of contacts and a wiping member, a conductive connection between each said contact and one of said magnets, a conductive connection between the wiping member and the signaling means, and means for advancing said wiping member in response to each actuation of said signaling means.

15. In a two-way communication system having identical transmitting and receiving units, a station for a dispatcher system, a plurality of indicator drums, a plurality of symbols upon each said drum, means for stepping up each said drum by electrical impulses, a signaling means associated with said station and having associated with it a plurality of symbols corresponding to the sylmbols upon said drum, means for placing said signaling means in electrical actuating connection successively with the step-up mechanism of the individual signal drums and means for actuating said rotating means and advancing each said drum, in succession, in response to actuation of the signaling means, and reset means, associated with said station and adapted to return said drums to their original position, whereby a new series of signals may be transmitted.

16. In a two-way communication system having identical transmitting and receiving units, a station for a dispatcher system, a plurality of indicator drums, a plurality of symbols upon each said drum, means for stepping up each said drum by electrical impulses, a signaling means associated with said station and having associated with it a plurality of symbols corresponding to the symbols upon said drum, means for placing said signaling means in electrical actuating connection successively with the step-up mechanism of the individual signal drums and means for actuating said rotating means and advancing each said drum, in succession, in response to actuation of the signaling means, and reset means, associated with said station and adapted to return said drums to their original position, and means associated with such station for actuating said reset means, whereby a new series of signals may be transmitted.

17. In a dispatcher system, receiving and dispatching stations each having a plurality of indicator drums, yielding means normally tending to hold said drums in non-indicating position, means for advancing said drums by electrical impulses into indicating position, signaling means and mechanism for placing said signaling means in actuating connection successively with the individual signal drums and means for actuating said drum advancing means to said drums, in response to actuation of the signaling means, and reset means adapted to release said drum advancing means and to permit said drums to return to non-indicating position.

18. In a dispatcher system, a plurality of stations and means for placing two of said stations in electric connection with each other, a plurality of indicator drums associated with each station, means tending to hold each such drum in non-indicating position, a magnet associated with each indicator drum, a lever controlled by said magnet and adapted to rotate said drum a predetermined distance in response to each movement of the lever, holding means adapted to prevent retrograde movement of the drums, an electric circuit for each such magnet, signaling means associated with each said station and means responsive to the actuation of said signaling means for closing and breaking said magnet circuits, and reset means, associated with each station, adapted when actuated, to withdraw said holding means and to permit the return of said drums to their original non-indicating position, and reset actuating means, associated with each station, and adapted to actuate the reset means of a station with which it is in connection, whereby a new series of signals may be transmitted.

19. In a two-way message transmitting apparatus, a plurality of units each adapted to send and to receive messages, a central station incorporating one of said units, a sub-station comprising one of said units, calling means in said stations, connecting means in the central station adapted to establish connection with said substation, message transmitting means in each station, adapted to transmit complete messages, comprising the permutation and combination of a group of characters, said means including an electric impulse generator, a series of reference characters associated with said generator, to designate the message, a series of drums rotatable responsive to the electric impulses to predetermined position according to impulse, a series of characters fixed upon said drums, corresponding to the characters upon said impulse generator, and means for operating said drum series simultaneously at both connected stations.

20. In a two-way message transmitting apparatus, a plurality of units each adapted to send and to receive messages, a central station incorporating one of said units, a sub-station, comprising one of said units, calling means in said stations, connecting means in the central station adapted to establish connection with said substation, substantially identical message transmitting means in each station, adapted to transmit complete messages, comprising the permutation and combination of a group of characters, said means including an electric impulse generator, a series of reference characters associated with said generator, to designate the message, a series of drums rotatable responsive to the electric impulses to predetermined position according to impulse, a series of characters fixed upon said drums, corresponding to the characters upon said impulse generator, and means for operating said drum series simultaneously at both connected stations.

21. In a two-way message transmitting apparatus, a plurality of substantially identical units, each adapted to send and to receive messages, a central station incorporating one of said units, a plurality of substations comprising one of said units, calling means in said stations, selective connecting means in the central station adapted to establish individual connection with each of said substations, substantially identical message transmitting means in each station, adapted to transmit complete messages, comprising the permutation and combination of a small group of simple characters, said means including an electric impulse generator, a series of reference characters associated with said generator, to designate the message, a series of drums rotatable responsive to the electric impulses, to predetermined position according to impulse groups, a series of simple characters fixed upon said drums, corresponding to the characters upon said impulse generator, and means for operating said drum series simultaneously at both connected stations.

ARCH D. ROLLINS.